Feb. 28, 1933.  N. M. STANLEY  1,899,777
LENS
Filed March 5, 1929

INVENTOR
NATHAN M. STANLEY.
BY Toulmin + Toulmin
ATTORNEYS

Patented Feb. 28, 1933

1,899,777

UNITED STATES PATENT OFFICE

NATHAN M. STANLEY, OF DAYTON, OHIO, ASSIGNOR, BY MESNE ASSIGNMENTS, OF ONE-HALF TO THE UNIVIS CORPORATION, OF WILMINGTON, DELAWARE, A CORPORATION OF DELAWARE, AND ONE-HALF TO UNITED KINGDOM OPTICAL COMPANY, LIMITED, OF LONDON, ENGLAND

LENS

Application filed March 5, 1929. Serial No. 344,302.

My invention relates to bifocal lenses.

It is the object of my invention to provide a bifocal lens blank with an appreciable space above and on either side thereof and below the insert.

It is a further object to provide a bifocal lens comprising a counter sink or major blank and a circular insert, the minor portion of said insert being of the same glass as that of the counter sink and disappearing therein as an integral part thereof, as distinguished from the major portion of the insert which is of different glass.

In particular, it is my object to provide an insert of one glass integrally formed with a counter sink of another glass of a shape different from that of the depression cut in the counter sink.

It is an object to provide such an insert which, upon completion, is so joined to the counter sink that no disagreeable reflection from the edges of the juncture will be found.

In particular, it is my object to provide an insert integrally formed in the counter sink, which has lateral and vertical dimensions that are substantially unequal.

It is an additional object to provide such an insert in which the top is flat and parallel with the major axis of the counter sink, while the sides and bottoms thereof constitute a portion of a circle, and in which the insert is located in the blank in spaced relationship from the margin of the counter sink to permit of vision through such space in the resulting lens. When I refer to counter sink I am referring to the entire major blank having the depression for the reception of the insert.

Referring to the drawing.

Figure 1:
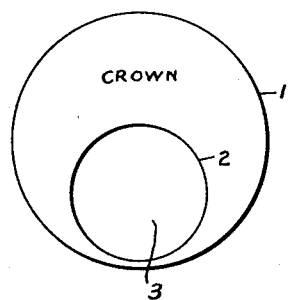
Figure 1 is a plan view of the counter sink with a portion thereof removed for the reception of the insert.
Figure 2:
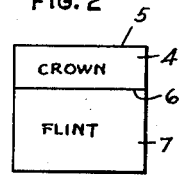
Figure 2 is a plan view of the insert before forming the edges.
Figure 3:
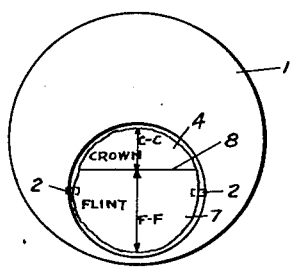
Figure 3 is a plan view of the formed insert.
Figure 4:
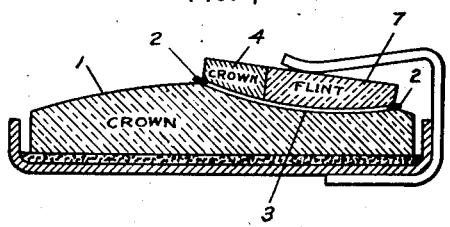
Figure 4 is a side elevation of the insert in position for fusing.
Figure 5:
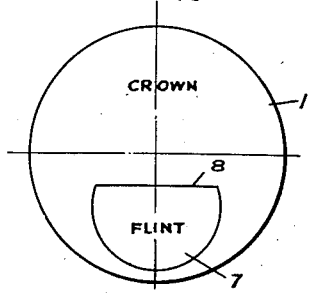
Figure 5 is a plan view of the completed fused lens blank.
Figure 6:
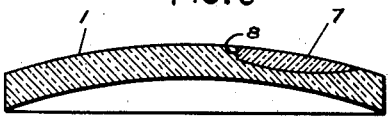
Figure 6 is a section through the completed blank.

Referring to the drawing in detail, 1 is a lens blank from the surface of which spaced from the margins thereof there has been cut away a portion, the margin of which is circular and the bottom of which is semi-circular. This margin is marked 2 and the base is marked 3. The counter sink is preferably made of crown glass.

Turning to the preparation of the insert, a narrow, oblong block of crown glass designated 4 having semi-finished or grey edges 5 and 6 is fused to a relatively large block of flint glass 7 likewise preferably having semi-finished edges or grey edges. It will be noted that the vertical dimension on the line $cc$ is very much less than the vertical dimension $ff$ so that the depth of the flint block is two to three times as great as that of the crown block.

This rectangular fused block of crown and flint glass is then chipped to a circle. The crown segment joins the flint segment on the straight line of juncture designated 8. The crown segment constitutes a relatively small portion of the circular insert.

The insert is placed upon the counter sink in the depression 3 in which it is fused in any suitable manner being located in position by feelers.

Upon the counter sink being fused with the insert the crown portion of the insert merges with and becomes an integral part of the crown glass of the counter sink while the flint portion of the insert becomes integrally fused to the bottom 3 and sides 2 of the counter sink.

It will be noted that the margin straight edge 8 of the insert of flint glass is parallel to the major transverse axis of the counter sink.

It will be further noted that the insert's lateral dimension is substantially equal to the sum of the distance on either side of the insert in the counter sink.

It will be further noted that there is sufficient space below the insert for distance vision through the crown glass.

It will be noted that the vertical and lateral dimensions of the flint insert are substantially the same and that the vertical axis of the insert coincide with the vertical axis of the counter sink.

The counter sink as finished is of different shape than the cut away portion 3 and its margin 2 in the counter sink. Thus, it is possible to accurately and effectively cut away in the well known manner a circular depression with the circular margin in the counter sink but secure an insert fused thereto of different shape as it would be virtually impossible to satisfactorily and accurately cut away the counter sink initially to insert an insert of the form that has resulted from my invention.

The resulting lens of my invention has the very substantial advantage of wide lateral, long distance vision on either side thereof, easy long distance vision above the flat top of the insert, a very deep reading area with sufficient space below this reading area for long distance vision as in walking upstairs, shifting the gear shift of an automobile, or other such uses where the ordinary bifocal lens, which has no long distance vision area beneath the insert or to one side thereof will prevent the user of the lens from having long distance vision under such circumstances.

It will be understood that I desire to comprehend within my invention such modifications as may be necessary to adapt it to varying conditions and uses.

Having thus fully described my invention, what I claim as new and desire to secure by Letters Patent, is:

1. In a lens, a major lens and an insert of different glass from the major lens, said insert consisting of a circular member less than a full circle with a flat top, the vertical dimension thereof being greater than the radius of the circle but less than the diameter of the circle.

2. In a lens, a major lens and an insert of different glass from the major lens, said insert consisting of a circular member less than a full circle with a flat top, the vertical dimension thereof being greater than the radius of the circle but less than the diameter of the circle, said insert being spaced from the bottom and side walls of the major lens to permit vision on either side and below as well as above the insert.

3. In a lens, a major lens of one kind of glass, a circular insert having its top cut off above the major diameter thereof and parallel therewith, the vertical dimension of the insert being less than the diameter but greater than the radius of the insert.

4. In a lens, a major lens of one kind of glass, an insert of another kind of glass, said insert comprising a circular member from which the top thereof has been removed above the diameter of the insert along a flat plane so that the vertical diameter of the insert is less than the horizontal diameter but greater than the radius of the insert, said insert being located with its flat top parallel but spaced from the horizontal center line of the major lens.

5. In a lens, a major lens of one kind of glass, an insert of another kind of glass, said insert comprising a circular member from which the top thereof has been removed above the diameter of the insert along a flat plane so that the vertical diameter of the insert is less than the horizontal diameter but greater than the radius of the insert, said insert being located with its flat top parallel but spaced from the horizontal center line of the major lens and so spaced from the margin of the major lens that the user of the lens can see through the major lens above, on both sides of and below the insert.

6. In a lens, a major lens having a circular cut away portion forming a semi-circular depression spaced from the bottom, side walls and top of the major lens, a circular insert mounted therein and divided on a chord above the diameter of the insert the portion of the insert below the chord having a vertical dimension less than the diameter of the insert but greater than the radius thereof.

7. In a lens, a major lens having a circular cut away portion forming a semi-circular depression spaced from the bottom, side walls and top of the major lens, a circular insert mounted therein and divided on a chord above the diameter of the insert the portion of the insert below the chord having a vertical dimension less than the diameter of the insert but greater than the radius thereof, the portion of the insert above the chord being of the same glass as the major lens and the portion below the chord being of a different glass.

8. In a lens, a one piece major lens having one surface cut away in a depression with a circular margin and semi-circular bottom, but not clear through the major lens, and an insert therefor of circular form and a semi-circular bottom fitting in said depression, said insert being divided on a chord above its center the area below the chord having a vertical dimension less than the diameter of the insert but greater than the radius thereof.

9. In a lens, a one piece major lens having one surface cut away in a depression with a circular margin and semi-circular bottom, but not clear through the major lens, and an insert therefor of circular form and a semi-circular bottom fitting in said depression, said insert being divided on a chord above its center the area below the chord having a vertical dimension less than the diameter of the insert but greater than the radius thereof, said chord being arranged parallel to the transverse center line of the major lens.

10. In a lens, a one-piece major lens having one surface cut away in a depression with a circular margin and semi-circular bottom, but not clear through the major lens, and an insert therefor of circular form and a semi-circular bottom fitting in said depression, said insert being divided on a chord above its center the area below the chord having a vertical dimension less than the diameter of the insert but greater than the radius thereof, said chord being arranged parallel to the transverse center line of the major lens, but offset therefrom and spaced from the edge of the major lens to provide vision above, through both sides and below the insert through the major lens.

11. In a lens, a major lens, an insert therein spaced from the walls of the major lens, said insert having a flat top and a round bottom, the vertical dimension of the insert being less than the diameter of the segment but greater than its radius.

12. A multifocal lens having a major portion with a countersink having a lens surface therein and a segmental portion of different index of refraction secured in said countersink and related to said lens surface of the countersink for near vision through the segment and underlying major portion, said segmental portion having a lower portion circular in outline and a top portion the bounding edge of which is substantially normal to the vertical diameter of the countersink and which is substantially a straight line and which lies between the center of the countersink circle and the top edge of said circle.

13. In a bifocal lens, a major lens having a single cavity and an insert of different glass from the major lens inserted therein, said insert consisting of a circular member less than a full circle, the vertical dimension thereof being greater than the radius of the circle but less than the diameter of the circle, and having a top of different outline from the outline of the remainder of the insert.

14. A bifocal lens having a major portion with a countersink having a lens surface therein, and an insert of different index of refraction secured in said countersink and related to said lens surface of the countersink for near vision through the insert and underlying major portion, said insert consisting of a circular member less than a full circle, the vertical dimension thereof being greater than the radius of the circle but less than the diameter of the circle, and having a top of different outline from the outline of the remainder of the insert.

15. A bifocal lens having a major portion with a countersink having a lens surface therein, and an insert of different index of refraction fused in said countersink and related to said lens surface of the countersink for near vision through the insert and underlying major portion, said insert consisting of a circular member less than a full circle with a flat top, the vertical dimension thereof being greater than the radius of the circle but less than the diameter of the circle.

In testimony whereof, I affix my signature.

NATHAN M. STANLEY.